Aug. 24, 1965 T. S. STAFFORD ETAL 3,202,972

MEASSAGE HANDLING SYSTEM

Filed July 17, 1962 3 Sheets-Sheet 1

INVENTORS
THOMAS S. STAFFORD
GERRY D. GRANITO

BY Robert W. Berray

ATTORNEY

Aug. 24, 1965 T. S. STAFFORD ETAL 3,202,972

MEASSAGE HANDLING SYSTEM

Filed July 17, 1962

3 Sheets-Sheet 3

United States Patent Office 3,202,972

Patented Aug. 24, 1965

3,202,972

MESSAGE HANDLING SYSTEM

Thomas S. Stafford, Wappingers Falls, and Gerry D. Granito, Poughkeepsie, N.Y., assignors to International Business Machines Corporation, New York, N.Y., a corporation of New York Filed July 17, 1962, Ser. No. 210,512
7 Claims. (Cl. 340—172.5)

This invention relates to a message handling system wherein messages being received on a plurality of input lines are accumulated in a memory such that a message being received on a particular one of the input lines is accumulated in a particular section of the memory and further, wherein end of message characters are received in a random fashion, and more particularly this invention relates to a message handling system wherein accumulated messages are transferred out of the memory in the same order in which the end of message character was received.

Increasing use is being made of transmission facilities for transmitting binary data from a plurality of outlying stations to a central processing unit. The basic problem encountered by these systems is to provide a peripheral unit with the ability to accumulate messages being received from the outlying terminals relieving the central processing unit from this burden. The peripheral interchange must be capable of receiving incoming messages from the terminals at a low rate of speed and then present the messages to the central processing unit at a higher rate of speed. The interchange must necessarily have a memory for accumulating and storing messages received from a particular terminal serial by bit and serial by character. Further problems are raised when the expense and most efficient use of transmitting facilities is considered.

Primary concern in an interchange of such a system is to provide the most efficient use of its memory and to allow terminals to transmit messages without having to wait. Possibly the most apparent way of providing a memory for storing messages from a particular terminal is to assign a block of the memory to a particular line and accumulate message characters from that line in the particular block. This would not provide an efficient use of the transmission facilities because a particular terminal could complete a message in its assigned block of the memory and then have to wait until the central processing unit has taken the completed message before a second message could be sent.

Another possible use of the memory would be to assign sequential blocks of memory to terminals in the order in which the terminals commence transmitting a message. This, however, gives rise to inefficient use of a memory. Assuming there are 30 incoming lines and a corresponding number of memory blocks for accumulating messages, and further assuming that the first message sent to the central processing unit is to come from the first block of memory, the first block of the memory will only be used once for every 30 messages received.

Further inefficiency results if the system is capable of simultaneously accumulating messages on the plurality of incoming lines by providing a periodic and sequential scanning of the input lines, such that each line is given an opportunity during a particular scan to present information into the memory. An extreme situation would result if the first terminal to commence transmission was assigned block 1 of the memory and the last terminal to commence transmission was assigned block 30 of memory but terminal 30 completes a variable length message prior to the time terminal 1 completes its message. With the system just proposed, the completed message in block 30 of memory would not be immediately sent to the central processing unit but would have to wait until 30 previous messages are completed and completely transferred.

The next most desirable step, to which this invention is directed, is to provide an interchange system wherein the first sequentially available block of a memory is assinged to incoming messages from a plurality of terminals in the order in which messages are started. The next desirable step would be to have a system wherein messages can be transferred to the central processing unit in an order dictated by the order in which the messages are completed to thus provide a central processing unit with complete messages as soon as assembled. It would be further desirable to provide more efficient use of the memory wherein a particular block of the memory could be assigned the function of accumulating a message as soon as it has been emptied such that it does not have to wait to receive every 30th message for example.

It is therefore an object of the present invention to provide a data handling system which stores a plurality of messages and transfers the messages to a central processing unit in the order in which the messages are completed.

It is another object of this invention to provide a data handling system wherein access to a memory for transfer of a designated message to a central processing unit is accomplished after an interval allotted for the sequential scanning of input lines for accumulation of messages.

It is an additional object of this invention to provide a data handling system wherein access to the memory for the orderly transfer of completed messages to a central processing unit is accomplished at a higher rate of speed than is access to the memory for periodically and sequentially presenting data to the memory from input lines.

It is a further object of this invention to provide a data handling system wherein the orderly transfer of messages from a memory to a central processing unit is accomplished by assigning a transfer order to the next completed message.

It is another object of this invention to provide a data handling system wherein the orderly transfer of messages from a memory is accomplished by providing an indication of the order of the next message to be transferred to the central processing unit.

In accordance with these and other objects of the invention, a system has been provided in which a number of data lines are scanned in sequence for detection and storage of information. At the completion of the line scan operation, a further portion of a complete scan cycle is used for assigning a transfer order to a completed message and/or controlling the order of transfer from memory storage to a central processing unit. When an end of message character is received for a particular line during the line scanning interval, the memory address containing the accumulated message is stored. At the end of the line scan interval, additional steps are taken to obtain a control word corresponding to the order of transfer out of memory to be assigned that completed message. The memory address of the completed message is inserted in the control word for the particular order, and the control word is stored until previously completed messages have been transferred to a central processing unit. When the line scanning interval has been completed, and the central processing unit has indicated a request for a character, the control word for the order being transferred is obtained to control access to the area in memory containing the message being transferred. Recognition of the end of message character being transferred to the central processing unit causes an indication to be made of the next transfer control word to be used which contains the memory address of the next message to be transferred. If at the end of a line scanning interval the central processing unit does not require a character and there has not been an end of message indication during the line scan interval, no transfer ordering will take place.

The foregoing and other objects, features and advantages of the invention will be apparent from the following more particular description of the preferred embodiment of the invention as illustrated in the accompanying drawings.

*General description*

Figure 1:
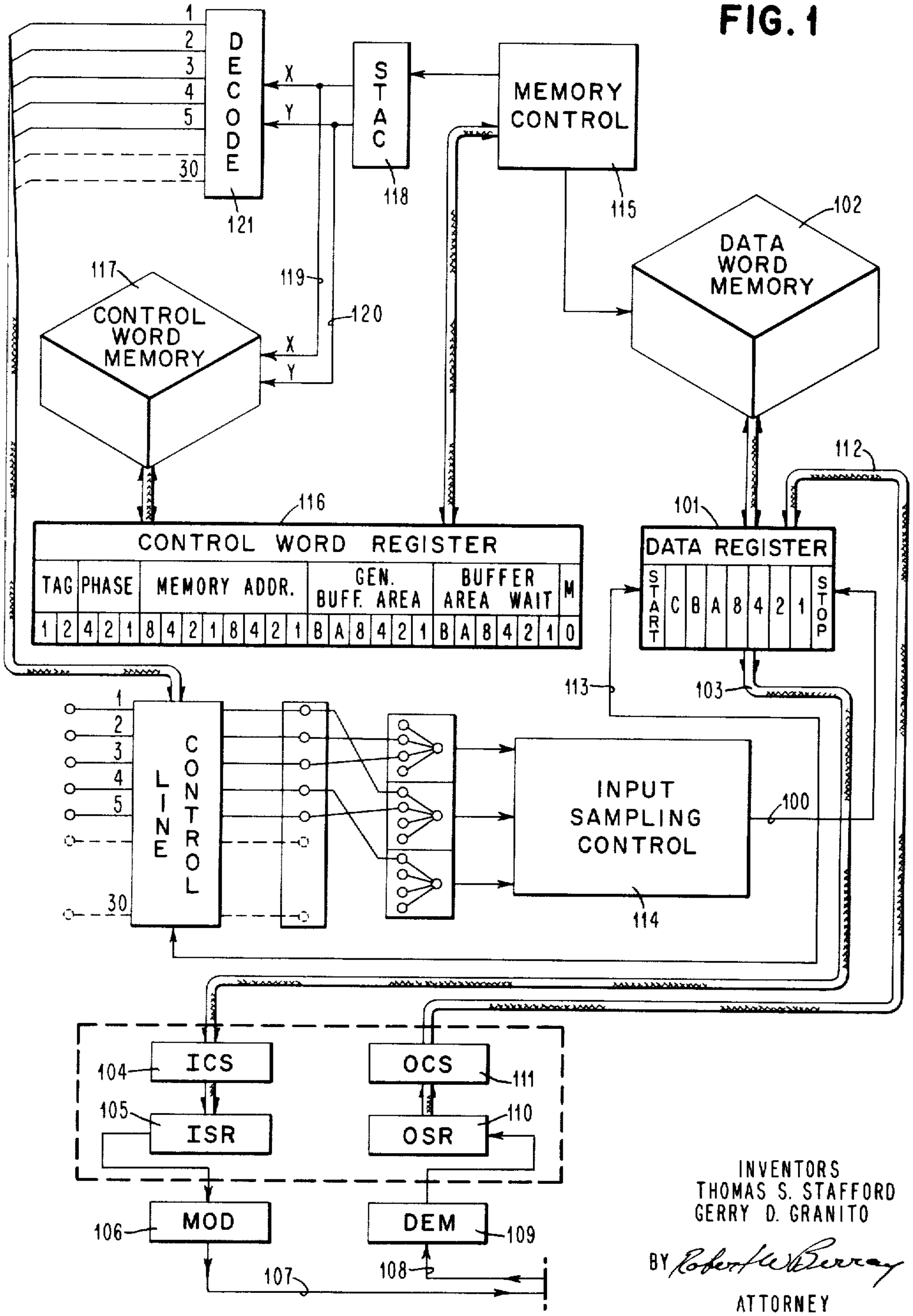
FIGURE 1 is a system diagram of a message handling system which uses the present invention.

The system of FIGURE 1 represents an interchange which forwards input messages from a group of terminal sets to a central computer, and receives output messages that are sent to the terminal sets by the computer.

Input messages are received from each terminal set over an associated one of the low speed lines 1–30. The messages are composed of related characters of information that are based on well known bit configurations such as Start-Check (C)—B–A–8–4–2–1–Stop or Start–1–2–3–4–5–Stop. Each line provides a succession of bits in one of the formats indicated which are shifted over line 100 into a Data Register 101 to form the proper characters. Related bits and characters from each line are stored temporarily in a Data Word Memory 102 until a complete message or message segment is assembled.

Completed input messages or message segments are transferred serial by character from the Data Word Memory 102 through the Data Register 101 over bus 103 to an Input Character Storage (ICS) Register 104, and from there to an Input Shift Register (ISR) 105 for serial by bit transfer to a Modulator (MOD) 106, and transmission over line 107 to a central computer, not shown.

Output messages are received serial by bit over line 108, detected by a Demodulator (DEM) 109, shifted into an Output Shift Register (OSR) 110, and transferred to an Output Character Storage (OCS) Register 111. Each output character is subsequently transferred over bus 112, and through the Data Register 101, to the Data Word Memory 102. When a complete output message or message segment has been received, it is then transferred from memory 102, with individual bits being forwarded from Data Register 101 over line 113 to the proper terminal set.

Each line is scanned only once during a particular scan interval, but in the preferred embodiment, successive line scans occur at a much higher rate than the transmission rate of any data line 1–30. The scan interval is actually composed of a number of stepping intervals 1–30 which correspond to the lines 1–30. Any desired number of lines within a reasonable range could be provided for during this interval.

Figure 2:
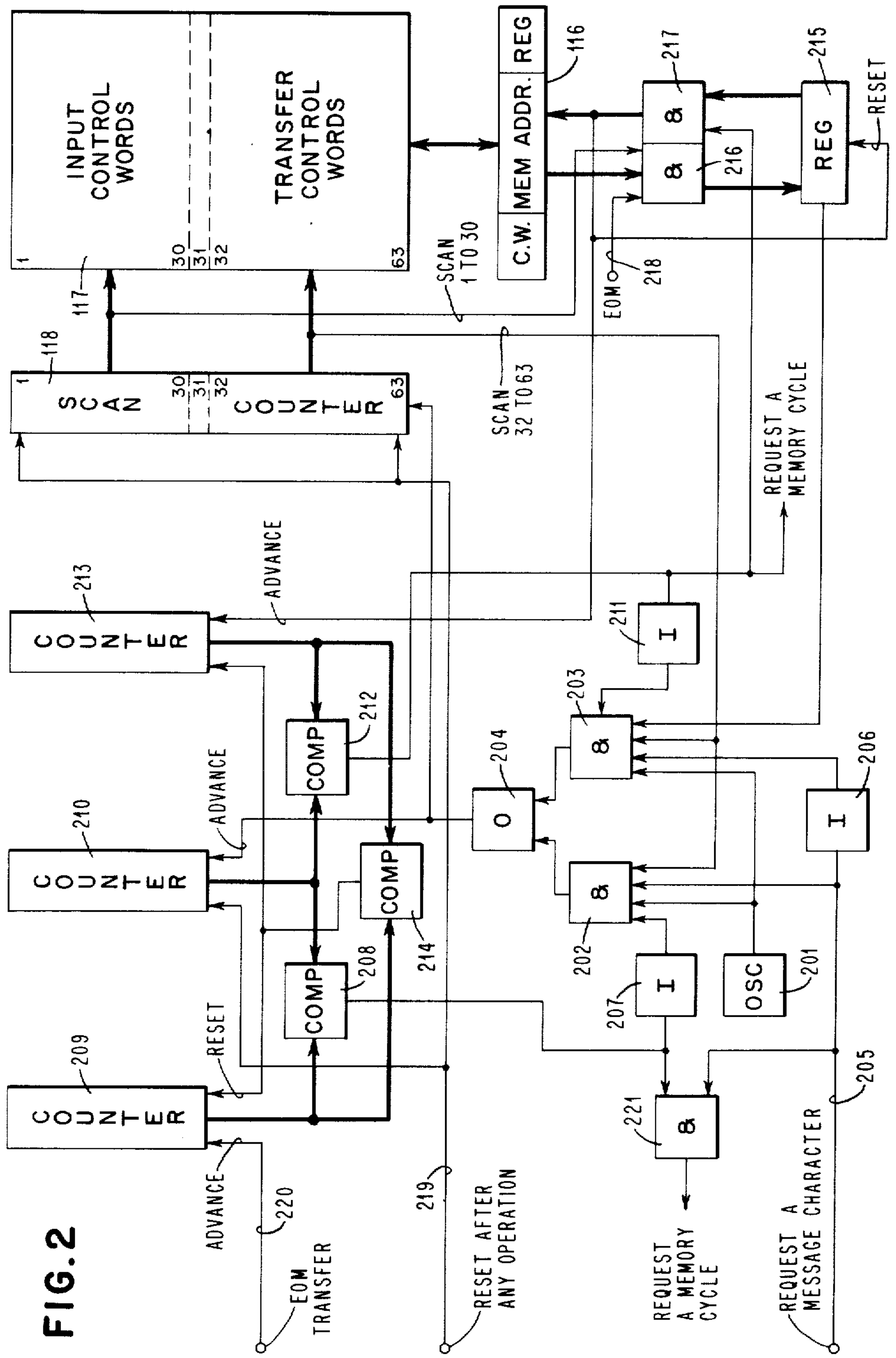
FIGURE 2 is a system diagram of a preferred embodiment of the present invention used in combination with the system shown in FIGURE 1.

In addition to the line stepping intervals 1–30, each scan period also includes a step 31 which is used for gating an output character from the Output Character Storage Register 111 to the Data Memory 102, and an additional step which is used either for gating an input character from Data Word Memory 102 to the Input Character Storage Register 104 or to assign a transfer order to a completed message to be discussed at length in connection with FIGURE 2.

The scanning, sampling and data transfer activities of the system of FIGURE 1 are under control of an Input Sampling Control 114 and a Memory Control section 115. The actions of both control sections are governed primarily by the contents of a Control Word Register 116. The operation of the Input Sampling Control 114 is explained in more detail in an application filed February 1, 1962, by H. D. Barker et al., Serial No. 170,401, entitled "Multiple Rate Data System," assigned to the assignee of this invention.

Control words are transferred to Register 116 from a Control Word Memory 117. Each line 1–30 has a control word that is located at a particular address in memory 117. Since the lines are scanned in sequence, the respective control words are also preferably arranged in sequence in memory 117. Control word addresses are established by an Address Counter (AC) 118 (also referred to as a "Storage Terminal Address Counter" or a "scan counter") at coordinate X–Y locations by signals on lines 119 and 120. When a particular control word is addressed, the coresponding line 1–30 is also addressed by deriving a line number from the X–Y addresses in Decode block 121. Therefore, as each line is scanned during a scan interval, its corresponding control word will be in Register 116.

Each control word has a configuration like that shown in FIGURE 1, and the control word bits are used to establish functions as indicated below.

Tag—2 bits: Parity Checking and End of Message (EOM) indications.
Phase—3 bits: Indicates sampling time for line involved.
Memory Address—8 bits: Defines data character location in Memory 102.
General Buffer Area—6 bits: Defines message block (plurality of character locations) in Memory 102.
Buffer Area Waiting—6 bits: Indicates location of output message in Memory 102 to be forwarded to a terminal.
Mode (M)—1 bit: Binary 1 indicates that output message to terminal is in progress. Binary 0 indicates that input message from terminal is in progress.

The Data Word Memory 102 is preferably divided into blocks of charatcers for handling messages or message characters. A suggested memory 102 configuration is as follows:

| | |
|---|---|
| Total capacity | 4000 characters. |
| Number of message blocks | 40 blocks of 100 characters each. |

When any line indicates that service is required, a General Buffer Area (GBA) is assigned to that line for accumulating data bits from that line and the General Buffer Area address is stored in the control word for that line. Each character is assembled in a particular character location within the assigned block of characters as defined by a Memory Address (MA) in the associated control word. As each character is completed, the next sequential character address is set into the control word. Assignment of General Buffer Areas and addressing of the Data Word Memory 102 in accordance with addresses in the Control Word Register 116 is accomplished by the Memory Control 115. If a complete message is assembled, the GBA (block) address is reset to zero, in preparation for another message. Further, the GBA (block) address is stored in a special register to await assignment of a transfer order in accordance with the present invention.

FIGURE 2 shows logic in addition to certain elements of FIGURE 1 utilized for assigning orders of transfer out of the data word memory of FIGURE 1. The control word memory 117, in addition to having 30 input control words associated with the 30 input lines, has an additional 32 control words used for assigning transfer orders, and 1 control word (position 31) for receiving messages from the central unit. Positions 1–30 of the scan counter 118 are used to obtain control words for insertion in the control word register 116 during the scanning interval associated with the input lines. Position 31 of the scan counter 118 and the associated transfer control word 31 is utilized to assign a general buffer area in the data word memory to control the accumulation of an entire message as an output message from the central processing unit to a particular one of the terminals. Positions 32–63 of the scan counter 118 and associated control words 32–63 are utilized in the transfer order assignment.

Stepping of scan counter 118 from positions 1 through 30 is under control of the Input Sampling Control 114 of FIGURE 1. Stepping of the scan counter 118 from positions 32–64 is under control of an oscillator 201. Oscillator 201 has a higher frequency than the oscillator of the Input Sampling Control such that control words 32–64 may be addressed at a much higher rate than the control words 1–30. The output of oscillator 201 is logically gated through AND circuits 202 and 203 and OR circuit 204.

When a central processing unit makes a request on line 205 for a character from the data word memory, AND circuit 202 will be enabled, and the same signal through inverter 206 disables AND circuit 203. The absence of a request for a message character on line 205 disables AND circuit 202 and enables AND circuit 203 through inverter 206. Both AND circuits 202 and 203 are further enabled when the scan counter 118 has completed positions 1–31 and is stepped to position 32.

The remaining input to AND circuit 202 is through an inverter 207 provided with a signal from a comparator 208. Comparator 208 compares the counts of a counter 209 and a counter 210. When the counts in counters 209 and 210 are equal, comparator 208 provides an output inverted by inverter 207 to disable AND circuit 202.

An additional input to AND circuit 203 is through an inverter 211 provided with an input signal from a comparator 212. Comparator 212 provides an output signal when counter 210 and a counter 213 are equal. The output of comparator 212 which indicates equality of counters 210 and 213 is inverted by inverter 211 to disable AND circuit 203.

The output of OR circuit 204 is not only utilized for advancing the count of scan counter 118 from positions 32–63 but is further utilized to advance the control counter 210. The operation of control counter 210 with counters 209 and 213 will be explained in more detail later. At the present time it should be noted that counter 213 is utilized to provide an indication of the number of messages which have been assembled and counter 209 is utilized to provide an indication of the number of messages which have been transferred out of the data word memory to the central processing unit. A further comparator 214 is provided to reset counters 209 and 213 when the contents of counters 209 and 213 are equal. This provides an indication that all of the input messages which have been assembled, indicated in counter 213, have been transferred out of the data word memory as indicated by counter 209.

A temporary storage register 215 is shown in FIGURE 2. Register 215 provides temporary storage for the General Buffer Area address containing a completed message to be assigned a transfer order. During scan steps 1–30 when one of the input control words is in the control word register 116 and the end of message condition is recognized, as signaled on line 218, means represented by an AND circuit 216 transfers the General Buffer Area address contained in the control word register 116 to register 215. At a later time during the scan steps 32–64, this General Buffer Area address will be transferred from register 215 through means represented by an AND circuit 217 to the General Buffer Area address position in the control word register 116 which will at that time contain one of the control words 32–63.

Figure 3:
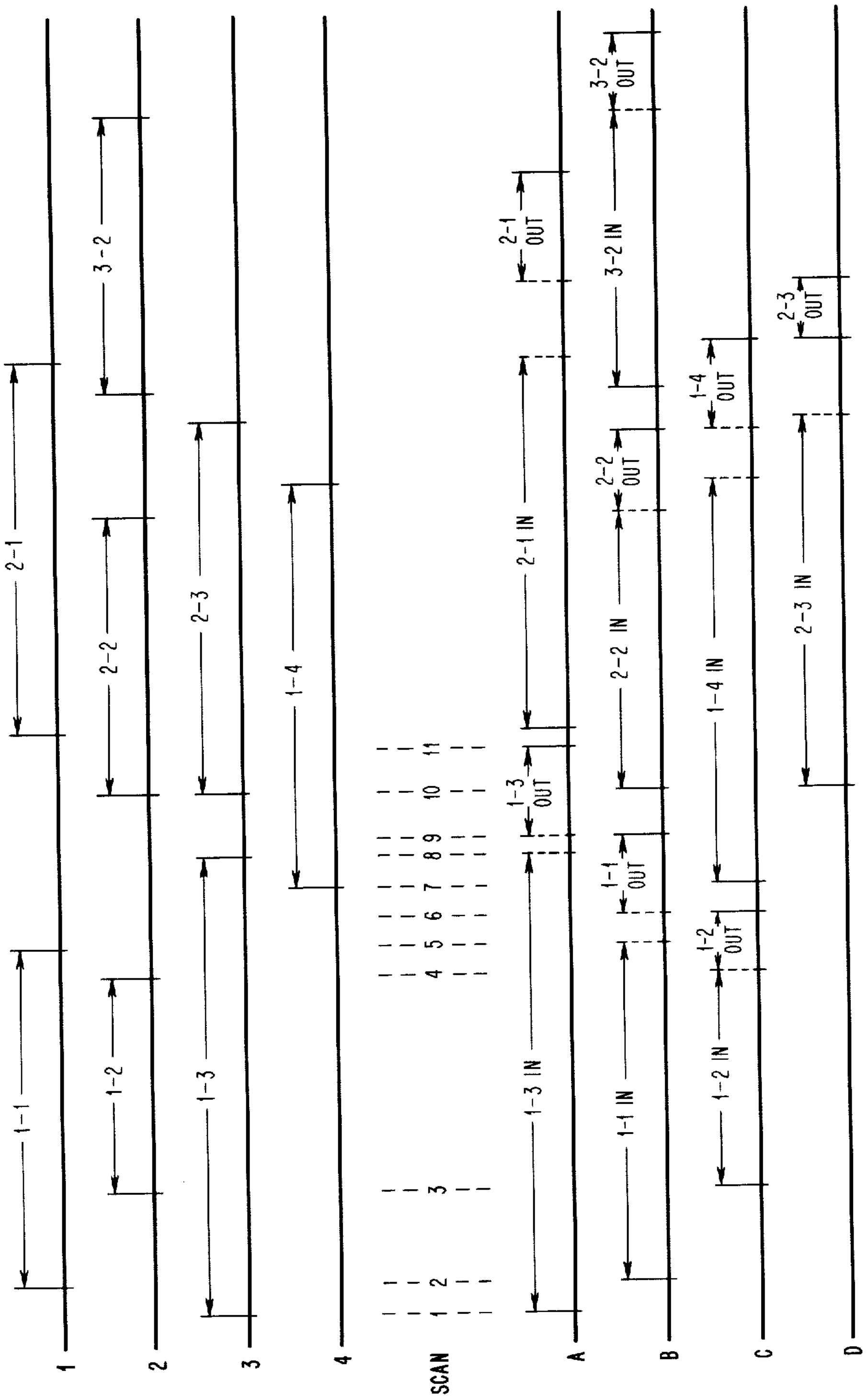
FIGURE 3 is a graphic representation of the functions performed by the logic of FIGURE 2.

Reference should now be made to FIGURE 3 which graphically shows various functions to be performed by the logic of FIGURE 2. The start and end of various messages are shown in the upper portion of FIGURE 3 for incoming lines designated 1 through 4. The lower portion of FIGURE 3 represents general buffer areas A, B, C, and D in the data word memory which are being used to accumulate messages from designated input lines and being utilized during a transfer period to the central processing unit. The messages being received on lines 1 through 4 are designated for example, 1–1 representing the first message on line 1, and 2–2 representing the second message on line 2. Lines A, B, C and D, representing the general buffer areas, show which of the various messages have been assigned to that area during the input operation and also when the general buffer area is being used to transfer out of the memory to the central processing unit. Two qualifications should be noted at this time in connection with FIGURE 3. When the start of a message is received, the first available general buffer area is assigned to that message, and further that transfer out of the data word memory to the central processing unit occurs at a faster rate than the messages are being accumulated in the data word memory.

A further point to keep in mind is that during any one particular scan interval, input messages are accumulated during each of the steps 1–30 of counter 118, output messages are accumulated during step 31, and at the completion of step 31 an additional period is utilized for assigning transfer orders to completed messages or to perform a transfer out of a particular one of the general buffer areas.

While any particular point along the horizontal axis of FIGURE 3 can represent a particular scan interval, the happening of certain events will be explained in connection with intervals labeled SCAN 1, SCAN 2, etc. During SCAN 1, steps 1 and 2 show no activity on lines 1 and 2, but line 3 produces the first signal of the first message received. The control word for line 3 will be in the Control Word Register 116 and will be assigned buffer area A. The second message to be started occurs on line 1 at SCAN 2 such that when the control word for line 1 is in the register 116 the general buffer area address for buffer area B will be inserted therein. At SCAN 3, step 1 of the scan will cause a signal from message 1–1 to be inserted in buffer area B, message 1–2 will be assigned general buffer area C during step 2, and during step 3 a signal will be inserted in general buffer area A for message 1–3.

During SCAN 4, a signal for message 1–1 will be entered in buffer area B, and at step 2 the end of message character will be recognized for message 1–2. At this time, the general buffer area address contained in the control word for line 2 will be temporarily stored. At step 3 of SCAN 4 a signal on line 3 will be stored in buffer area A. At the end of the line scanning period, the end of message indication received on line 2 will initiate the transfer order assignment. Because the end of message on line 2 was the first received, the first transfer control word will be obtained from the transfer control word memory and the temporarily stored general buffer area address will be inserted in the first transfer control word. At the end of the line scan interval of the next following SCAN, transfer out of the data word memory to the central processing unit can commence for message 1–2 contained in buffer area C under control of the first transfer control word.

During SCAN 5 the end of message indication is received for message 1–1. If a cycle does not have to be utilized for transfer out of buffer area C, the cycle immediately following the line scan period can be utilized to obtain the second transfer control word for insertion therein of the general buffer area address of buffer area B. Reading out of buffer area B cannot commence until completion of readout from buffer area C. At SCAN 6, readout of buffer area C will be completed and at the next succeeding scan interval the second transfer control word can be utilized for reading out message 1–1 contained in buffer area B.

At SCAN 7, message 1–4 is initiated. At this time buffer area A is being read into, buffer area B is being read out of, but buffer areas C and D are empty. Since the first available area is to be assigned, buffer area C will be assigned to message 1–4 and the general buffer area address for buffer area C will be placed in the control word for line 4.

At SCAN 8, the end of message indication will be received for message 1–3 and the third transfer control word will be assigned to receive the general buffer area address for buffer area A. Read out of the third completed message, message 1–3, cannot commence until completion of read out of message 1–1. At SCAN 9, read out of message 1–1 will be completed and in the next following scan read out of message 1–3 from buffer area A can comence under control of the third transfer control word.

At SCAN 10, start of message characters are received for both line 2 and line 3. Line 2 will be the first line sampled during the input line scan interval, such that line 2 will be assigned the first available general buffer area. Buffer area A is being read out of and buffer area C is being read into but buffer area B is empty. Message 2–2 will therefore be accumulated in buffer area B. At the next step of SCAN 10, when line 3 is being sampled, buffer areas A, B, and C are in use such that buffer area D will be assigned for accumulating message 2–3.

At SCAN 11, read out of message 1–3 from buffer area A will be completed. At this time there will be an indication that there have been 3 messages received and assigned transfer orders, and further that there have now been 3 completed messages transferred to the central processing unit. At this time the control for assigning transfer control words will be reset to zero such that the next completed message will again be assigned the first transfer control word.

The remaining scan intervals utilize the principles just set out, and show various start of message and end of message situations and the time in which the various messages are transferred out of the data word memory to the central word processing unit.

The flexibility and efficiency of the arrangement depicted in FIGURE 3 over the alternatives suggested in the introduction are apparent. Take, for example, line 3. If it were always assigned buffer area A, message 2–3 could not have started at SCAN 10, but the terminal would have to wait until message 1–3 is transferred out of SCAN 11. The other alternative was to assign buffer areas in sequence in accordance with start of messages, but to also transfer out of memory in the same sequence. If no transfer out could start until message 1–3 was completed, message 1–2 could not be transferred out until areas A and B were emptied. All this time, area C has a message ready and must remain idle.

Returning now to FIGURE 2, the operation of the logic shown therein will be explained in connection with certain scan intervals shown in FIGURE 3. During SCANS 1, 2, and 3 start of message characters will be recognized on lines 3, 1 and 2 respectively and assigned general buffer areas A, B and C respectively. The general buffer areas assigned will be carried by the control word for the particular line involved. During SCAN 4, the end of message indication is received on line 2 during that step of the input scan interval. The end of message (EOM) character will produce a signal on line 218 as an input to AND circuit 216 in FIGURE 2. Since this is during the scan steps 1 to 30, AND circuit 216 will be conditioned to transfer the general buffer area address from the control word register 116 to the temporary storage register 215. The input control word for line 2 will be returned to the control word memory 117 after having the general buffer area address reset to await assignment of another buffer area address for any following messages. At this time it should be noted that if an end of message character has been recognized on a particular one of the input lines, and the general buffer area address stored in register 215, and a following line in the scan steps 1–30 also recognizes an end of message character, the control word for that line will be returned to the control word memory 117 to await a succeeding scan interval at which time the register 215 will be available for receiving the general buffer address.

When the scan counter 118 reaches position 32 during the scan interval in which the end of message character was recognized on line 2, transfer control word 32 representing the first transfer control word will be assigned. The scan 32–64 line will be providing a signal to AND circuits 202 and 203. Register 215 will provide one final signal to AND circuit 203 indicating a general buffer area address has been inserted therein. Assuming that there is no request for a message from the central processing unit on line 205, inverter 206 inverts this signal to provide another conditioning signal to AND circuit 203. Oscillator 201 will be providing pulses to AND circuit 203.

Since this is the first message to be assigned a transfer order, counter 213 will be at a count of 0. Counter 210 will be at 0 so that comparator 212 will immediately provide an output to inverter 211 to disable AND circuit 203 such that counter 210 and scan counter 118 are not stepped. The immediate compare signal from comparator 212 is utilized to request a memory cycle such that the transfer control word 32 is taken from control word memory 117 and placed in control word register 116. The immediate compare signal is then further utilized to condition AND circuit 217 to transfer the general buffer area address temporarily stored in register 215 to the general buffer area address of transfer control word 32. Transfer control word 32 is then immediately placed back into control word memory 117.

The transfer of the general buffer area address through AND circuit 217 is then utilized to reset register 215 and to advance the count one place in counter 213. Counter 213 now indicates that one completed message has been provided a transfer order such that the next completed message should be assigned the second transfer control word. Before considering how the central processing unit is transferred completed messages in the proper order, consideration will be given to a situation where it is assumed that, for example, 8 messages have been assigned transfer order control words. In this situation, counter 213 will contain a count of 8. Further let it be assumed that during a particular scan interval an end of message indication is received such that this particular message is to be assigned the ninth transfer control word. At the end of the input line scanning intervals 1–30, and when scan counter 118 has stepped to position 32, AND circuit 203 and OR circuit 204 will be conditioned to pass oscillator 201 pulses to counter 210 and to the scan counter 118. Counter 210 will be stepped from zero to a count of 8 at the same time scan counter 118 is being stepped from position 32 to position 40 corresponding to transfer control word 40. When the count of counter 210 reaches 8 which corresponds to the count in counter 213, comparator 212 will provide an output to disable AND circuit 203 and request a memory cycle to read out transfer control word 40 to the control word register 116. AND circuit 217 will be enabled to transfer the temporarily stored general buffer area address in register 215 to the general buffer area address in the transfer control word 40. Transfer of the memory address through AND circuit 217 will be effective to reset register 215 and advance the counter 213 to a count of 9 to assign the next following end of message the tenth transfer control word.

It can be seen that scan counter 118, which requires a memory cycle to obtain the input line control words for each of the lines during the scan steps 1–30, is stepped at a much faster rate to the exact transfer control word required before a memory cycle is necessary. Line 219 labeled reset after any operation is used to reset counter 210 and the scan counter 118 after any particular scan interval. If at the end of scanning steps 1–30 there is no requirement for assigning a transfer order and there is no requirement for transferring a character to the central processing unit the scan counter is immediately reset to scan position 1 to initiate another line scanning interval.

The manner in which the proper order of transfer out of the data word memory to the central processing unit is achieved will now be discussed. Counter 209 provides the necessary indication showing the number of messages which have been transferred out to the central processing unit. When position 32 of the scan counter 118 is reached, and a request message character is received on line 205 from the central processing unit, AND circuit 202 will be enabled and AND circuit 203 will be disabled through inverter 206. At this time oscillator pulses will be transferred through AND circuit 202 to simultaneously step counter 210 and scan counter 118. On a transfer out operation, counter 209 and counter 210 provide the indication through comparator 208 as to when the stepping of scan counter 118 is to stop. Assuming that the first message is to be transferred to the central processing unit, counter 209 will be at zero thus causing an immediate compare from comparator 208 to disable AND circuit 202 and request a memory cycle thereby transferring transfer control word 32 to the control word register 116. The general buffer area address contained in transfer control word 32 provides the indication as to which of the general buffer areas contains the message which was the first message to be completed. This address controls the access to the data word memory to present a character to the central processing unit. In the example shown in FIGURE 3, the first message which is transferred out to the central processing unit is message 1–2 which was inserted in general buffer area C. When the end of message character is recognized for message 1–2 in FIGURE 3 at SCAN 6, a signal will be generated on the end of message transfer line 220 (EOM TRANSFER) to advance the count in counter 209 one position. Counter 209 now indicates that the next message to be transferred to the central processing unit is to come from the general buffer area contained in transfer control word 33. The next time the central processing unit requests a message character on line 205, AND circuit 202 will be enabled to pass advance pulses to counter 210 and scan counter 118 until such time as counter 209 and counter 210 compare at comparator 208.

SCAN 11 in FIGURE 3 shows a situation wherein completed messages which have been assigned a transfer order have all been transferred out to the central processing unit. In this situation counter 13 will be indicating that 3 completed messages have been assigned a transfer order and counter 209 will indicate that 3 completed messages have been transferred to the central processing unit. At this time the count in counters 209 and 213 will be equal and a signal will be produced from comparator 214 which resets counters 209 and 213. The next transfer control word to be assigned will be position 32 of the scan counter 118.

The request message character line 205 is utilized to enable an AND circuit 221. Since at any particular time there will be more messages assigned a transfer order than there have been messages transferred out to the central processing unit, counter 209 will have a lower value than counter 213. A comparison signal from comparator 208 will normally be produced before a compare signal from comparator 212. In a situation where a transfer order is to be assigned through the use of counters 210 and 213, AND circuit 221 is disabled so as not to request a memory cycle even though a compare signal from comparator 208 is produced when counters 209 and 210 agree. Only when a character is to be transferred out to the central processing unit is the request memory cycle generated from AND circuit 221.

Another point to keep in mind in connection with FIGURE 2 is that transfer of characters out of the data word memory to the central processing unit is to take precedence over assigning a transfer order to a completed message. If the request message character line 205 is producing a signal at step 32 of scan counter 118, assignment of a transfer control word to a completed message will be deferred until the next following scan interval. This is the reason for inhibiting the action of AND circuit 203 through inverter 206 when a request message character is indicated on line 205. The relative speed at which transfer orders must be assigned compared with the rate at which the central processing unit requests characters is such that approximately three complete scanning intervals can take place between each request for a message character from the central processing unit. This speed differential then allows sufficient time to fulfill the requirements of the central processing unit before proceeding to the assignment of a transfer control word to be a completed message.

There has thus been shown a means whereby randomly received messages on a plurality of lines can be assigned general buffer areas in a memory in a random fashion. The order in which messages are completed can be indicated and then utilized to control the order in which messages are transferred out of the randomly assigned general buffer areas to a central processing unit. There is also shown a scanning arrangement whereby input lines can be scanned in a step by step fashion at a certain rate and wherein the scanning means can be stepped at a much faster rate to obtain control words utilized for transferring the messages out of the data word memory in the proper order. This device thus provides more efficient use of transmission facilities and available memory locations in the accumulation of randomly received messages on a plurality of input lines.

While the invention has been particularly shown and described with reference to a preferred embodiment thereof, it will be understood by those skilled in the art that changes in form and details may be made therein without departing from the spirit and scope of the invention.

What is claimed is:

1. In a message handling system wherein messages and end of message characters are randomly received on a plurality of input lines each associated with a stored input control word containing the address of a main memory area in which a message from the respective input line is being stored and wherein a scanning means is provided for utilizing the input control words in a given sequence to control the sampling of messages received from the respective input lines and the storing of such messages in the appropriate main memory areas, an apparatus for enabling completed messages to be transferred from the main memory to a utilization device in the same order as the messages are completed, said apparatus comprising:

first storage means having a plurality of addressable storage positions therein for respectively storing a plurality of transfer control words adapted to be utilized in a given sequence for controlling the transfer of information sequentially from designated main memory areas to the utilization device, addressing means associated with said first storage means and operable in the interval between successive input scanning operations for addressing in sequence the respective storage positions wherein the transfer control words are stored;

temporary storage means for temporarily storing a memory address respectively associated with any of the input lines;

first control means responsive to an end of message character received on any of the input lines for causing the memory address portion of the input control word associated with that line to be stored in said temporary storage means;

counting means for maintaining a count representing the number of end of message characters received, each number in said count also indicating an order of transfer priority to be assigned to the corresponding one of the completed messages;

and second control means responsive to said addressing means and to said counting means, in the intervals between input scanning operations, for causing the memory address stored in said temporary storage means to be transferred into the storage position of a selected one of the transfer control words according to the count number than registered by said counting means, thereby conditioning the system for transferring stored messages from the main memory to the utilization device in the same order as the messages are completed.

2. The apparatus of claim 1 wherein said second control means includes:

a second counting means operable concurrently with said addressing means to register in each instance a number representing the transfer control word storage position then being addressed;

and comparator means responsive to an equality of count numbers respectively registered by the first-named counting means and said second counting means to initiate an operation of said second control means whereby the memory address of a completed message is inserted into the transfer control word then being addressed by said addressing means.

3. The apparatus of claim 2, and advancing means effective during the intervals between input scanning operations for causing said second counting means and said transfer control word addressing means to be advanced at a rate exceeding the rate at which the input lines are scanned.

4. In a message handling system wherein messages and end of message characters are randomly received on a plurality of input lines each associated with a stored input control word containing the address of a main memory area in which a message from the respective input line is being stored and wherein a scanning means is provided for utilizing the input control words in a given sequence to control the sampling of messages received from the respective input lines and the storing of such messages in the appropriate main memory areas, an apparatus responsive to requests for message characters from a utilization device for causing completed mesages to be transferred from the main memory to the utilization device in the same order as the messages are completed, said apparatus comprising:

first storage means having a plurality of addressable storage positions therein for respectively storing a plurality of transfer control words adapted to be utilized in a given sequence for controlling the transfer of information sequentially from designated main memory areas to the utilization device, addressing means associated with said first storage means and operable in the interval between successive input scanning operations for addressing in sequence the respective storage positions wherein the transfer control words are stored;

temporary storage means for temporarily storing a memory address respectively associated with any of the input lines;

first control means responsive to an end of message character received on any of the input lines for causing the memory address portion of the input control word associated with that line to be stored in said temporary storage means;

counting means for maintaining a count representing the number of end of message characters received, each number in said count also indicating an order of transfer priority to be assigned to the corresponding one of the completed messages;

second control means responsive to said addressing means and to said counting means, in the intervals between input scanning operations, for causing the memory address stored in said temporary storage means to be transferred into the storage position of a selected one of the transfer control words according to the count number then registered by said counting means, thereby conditioning the system for transferring stored messages from the main memory to the utilization device in the same order as the messages are completed;

and third control means responsive to said addressing means and to requests for message characters received from the utilization device, in the intervals between input scanning operations, for causing the messages stored at the respective addresses in the main memory to be transferred to the utilization device under the control of the stored transfer control words containing such addresses, said messages being transferred in the same sequence that the respective storage positions are addressed by said addressing means, whereby the utilization device receives the stored messages in the order in which they were completed.

5. The apparatus of claim 4 wherein said second control means includes:

second counting means operable concurrently with said addressing means to register in each instance a count number representing the storage position of the transfer control word then being addressed, and first comparator means responsive to an equality of count numbers respectively registered by the first-named counting means and said second counting means to initiate an operation of said second control means whereby the memory address of a completed message is inserted into the transfer control word then being addressed by said addressing means; and said third control means includes:

third counting means for maintaining a count representing the number of messages transferred from the main memory to the utilization device, and second comparator means responsive to an equality of count numbers respectively registered by said second counting means and said third counting means to initiate an operation of said third control means for transferring from the main memory to the utilization device the message whose address is stored in the transfer control word then being addressed.

6. The apparatus of claim 5, and advancing means effective during the intervals between input scanning operations for causing said second counting means and said transfer control word addressing means to be advanced at a rate exceeding the rate at which the input lines are scanned.

7. The apparatus of claim 5, and third comparator means responsive to an equality of count numbers respectively registered by said first counting means and said third counting means for causing said first and third counting means to be reset, thereby to start new counts of the completed messages and transferred messages, respectively, when all of the completed messages stored in the main memory have been transferred to the utilization device.

References Cited by the Examiner

UNITED STATES PATENTS

| | | | |
|---|---|---|---|
| 2,968,027 | 1/61 | McDonnell et al. | 340—172.5 |
| 3,029,414 | 4/62 | Schrimpf | 340—172.5 |
| 3,061,192 | 10/62 | Terzian | 340—172.5 |

MALCOLM A. MORRISON, *Primary Examiner.*